United States Patent
Deguchi et al.

(10) Patent No.: US 8,470,475 B2
(45) Date of Patent: Jun. 25, 2013

(54) NON-AQUEOUS ELECTROLYTE SECONDARY BATTERY

(75) Inventors: Masaki Deguchi, Hirakata (JP); Tooru Matsui, Fujiidera (JP); Hiroshi Yoshizawa, Hirakata (JP)

(73) Assignee: Panasonic Corporation, Osaka (JP)

( * ) Notice: Subject to any disclaimer, the term of this patent is extended or adjusted under 35 U.S.C. 154(b) by 1786 days.

(21) Appl. No.: 11/287,446

(22) Filed: Nov. 28, 2005

(65) Prior Publication Data

US 2006/0083988 A1    Apr. 20, 2006

Related U.S. Application Data

(63) Continuation-in-part of application No. PCT/JP2005/004655, filed on Mar. 16, 2005.

(30) Foreign Application Priority Data

Apr. 7, 2004    (JP) .................................. 2004-113208

(51) Int. Cl.
*H01M 4/13*    (2010.01)
(52) U.S. Cl.
USPC .................................. 429/231.95; 429/231.9
(58) Field of Classification Search
USPC ..................................... 429/231.95
See application file for complete search history.

(56) References Cited

U.S. PATENT DOCUMENTS

| 6,241,959 B1 * | 6/2001 | Cho et al. ................... 423/594.4 |
| 2002/0102456 A1 * | 8/2002 | Aihara et al. ................. 429/144 |
| 2002/0192565 A1 | 12/2002 | Ueda et al. |
| 2003/0054259 A1 | 3/2003 | Murai et al. |
| 2004/0234853 A1 * | 11/2004 | Adachi et al. .............. 429/231.1 |
| 2006/0172201 A1 | 8/2006 | Yasukawa et al. |
| 2007/0072086 A1 | 3/2007 | Nakagawa |
| 2007/0122703 A1 * | 5/2007 | Whitfield et al. ............. 429/224 |
| 2007/0218370 A1 | 9/2007 | Deguchi et al. |

FOREIGN PATENT DOCUMENTS

| JP | 2003-031259 | 1/2003 |
| JP | 2003-151621 | 5/2003 |
| JP | 2003-151621 A * | 5/2003 |

(Continued)

OTHER PUBLICATIONS

European Search Report issued in Patent Application No. 05720909.0-1227 / 1734607 PCT/JP2005004655 dated on Aug. 6, 2008.

(Continued)

*Primary Examiner* — Ula C Ruddock
*Assistant Examiner* — Jacob Marks
(74) *Attorney, Agent, or Firm* — McDermott Will & Emery LLP

(57) ABSTRACT

A non-aqueous electrolyte secondary battery includes: a positive electrode capable of absorbing and desorbing lithium; a negative electrode capable of absorbing and desorbing lithium; a separator interposed between the positive electrode and the negative electrode; and a non-aqueous electrolyte. The positive electrode includes a composite oxide represented by formula (1): $LiNi_xM_{1-x-y}L_yO_2$ as an active material. The formula (1) satisfies $0.3 \leq x \leq 0.9$ and $0 \leq y \leq 0.1$. The element M is at least one selected from the group consisting of Co and Mn, and the element L is at least one selected from the group consisting of Mg, Al, Ti, Sr, Zn, B, Ca, Cr, Si, Ga, Sn, P, V, Sb, Nb, Ta, Mo, W, Zr, Y and Fe. The non-aqueous electrolyte includes a main solvent, a solute and vinyl ethylene carbonate.

7 Claims, 1 Drawing Sheet

FOREIGN PATENT DOCUMENTS

| | | |
|---|---|---|
| JP | 2003-151623 | 5/2003 |
| JP | 2003-173819 | 6/2003 |
| JP | 2003-234127 | 8/2003 |
| JP | 2003-249262 | 9/2003 |
| JP | 2004-022174 | 1/2004 |
| JP | 2004-214139 | 7/2004 |
| JP | 2004-265849 | 9/2004 |
| WO | WO 03/019713 A1 | 3/2003 |
| WO | WO 2004/102700 A1 | 11/2004 |
| WO | WO 2005/099023 A1 | 10/2005 |

OTHER PUBLICATIONS

Japanese Office Action issued in Japanese Patent Application No. JP 2006-519424 dated May 19, 2011.

* cited by examiner

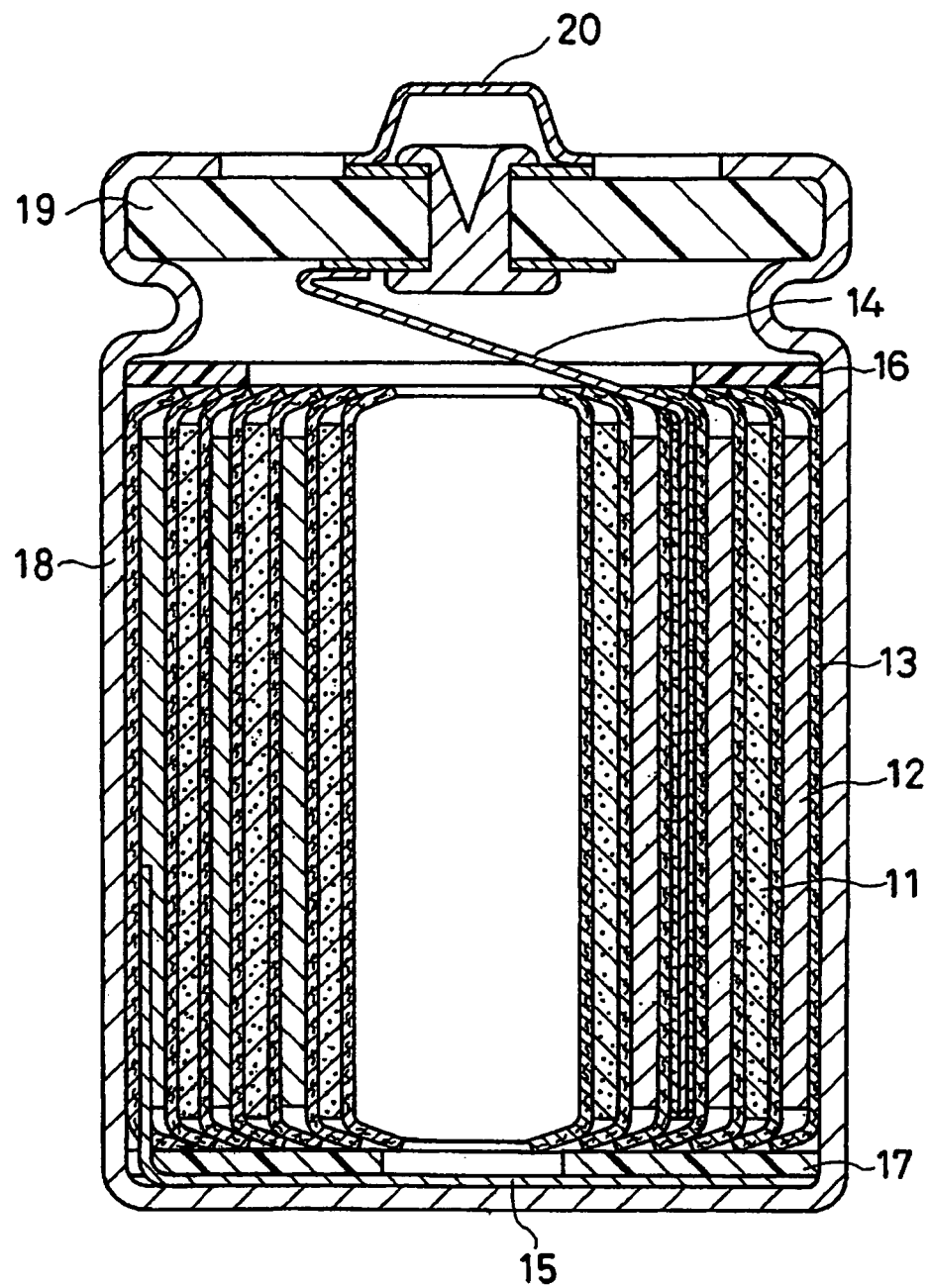

NON-AQUEOUS ELECTROLYTE SECONDARY BATTERY

RELATED APPLICATIONS

This application is a continuation or continuation-in-part of International Application No. PCT/JP05/004655, whose international filing date is Mar. 16, 2005 which in turn claims the benefit of Japanese Application No. 2004-113208, filed Apr. 7, 2004, the disclosures of which Applications are incorporated by reference herein. The benefit of the filing and priority dates of the International and Japanese Applications is respectfully requested.

FIELD OF THE INVENTION

The present invention relates to a non-aqueous electrolyte secondary battery, and particularly, to the combination of its positive electrode active material and non-aqueous electrolyte.

BACKGROUND OF THE INVENTION

Currently, in the field of non-aqueous electrolyte secondary batteries, studies have been actively conducted on lithium ion secondary batteries having high voltages and high energy densities. The positive electrode active material of a lithium ion secondary battery is typically a lithium-containing transition metal oxide, such as $LiCoO_2$, and the negative electrode active material is typically a carbon material. A secondary battery of this kind includes an electrolyte composed of a non-aqueous solvent and a solute dissolved therein. Exemplary non-aqueous solvents include cyclic carbonic acid ester, chain carbonic acid ester, and cyclic carboxylic acid ester. Exemplary solutes are lithium salts, such as lithium hexafluorophosphate ($LiPF_6$) and lithium tetrafluoroborate ($LiBF_4$).

With the aim of improving the characteristics of non-aqueous electrolyte secondary batteries, attempts have been made to add various additives to the positive electrode, negative electrode, and/or electrolyte. For example, in order to improve charge/discharge cycle characteristics or improve charge/discharge characteristics at low temperatures, there have been proposals to add vinylene carbonate or vinyl ethylene carbonate to an electrolyte (see Japanese Laid-Open Patent Publication No. 2003-151621, No. 2003-31259, and No. 2003-249262). Vinylene carbonate or vinyl ethylene carbonate is decomposed on the negative electrode to form a protective film, thereby suppressing the side reaction between the electrolyte and the negative electrode active material.

Even if vinylene carbonate or vinyl ethylene carbonate is contained in the electrolyte, the side reaction between the electrolyte and the positive electrode active material may violently occur particularly in a high-temperature environment, resulting in dramatic degradation in cycle characteristics. Particularly, when a highly reactive positive electrode active material as proposed by Japanese Laid-Open Patent Publication No. 2003-249262 is used, the cycle characteristics in a high-temperature environment tend to become insufficient. It is therefore an object of the present invention to provide a non-aqueous electrolyte secondary battery that exhibits good charge/discharge cycle characteristics particularly in a high-temperature environment.

BRIEF SUMMARY OF THE INVENTION

A non-aqueous electrolyte secondary battery in accordance with the present invention includes: a positive electrode capable of absorbing and desorbing lithium; a negative electrode capable of absorbing and desorbing lithium; a separator interposed between the positive electrode and the negative electrode; and a non-aqueous electrolyte. The positive electrode includes a composite oxide represented by formula (1): $LiNi_xM_{1-x-y}L_yO_2$ as an active material, and the formula (1) satisfies $0.3 \leq x \leq 0.9$ and $0 \leq y \leq 0.1$. The element M is at least one selected from the group consisting of Co and Mn, and the element L is at least one selected from the group consisting of Mg, Al, Ti, Sr, Zn, B, Ca, Cr, Si, Ga, Sn, P, V, Sb, Nb, Ta, Mo, W, Zr, Y and Fe. The non-aqueous electrolyte includes a main solvent, a solute and vinyl ethylene carbonate.

In a non-aqueous electrolyte secondary battery with a non-aqueous electrolyte containing vinyl ethylene carbonate, when vinyl ethylene carbonate decomposes on the negative electrode, 1,3-butadiene is produced. This 1,3-butadiene has an effective action on a specific composite oxide represented by the formula (1), thereby suppressing the side reaction between the electrolyte and the positive electrode active material. The reason is probably as follows.

That is, when a sufficient amount of Ni (30 mol % or more of the total of Ni, the element M and the element L) is incorporated in the crystal structure of a composite oxide that is used as a positive electrode active material, a metal oxide NiO is produced on the surface of the composite oxide. Due to the action of this metal oxide NiO as an initiator, 1,3-butadiene produced by the decomposition of vinyl ethylene carbonate on the negative electrode causes a polymerization reaction on the surface of the positive electrode active material, thereby forming a polymer-like protective film on the positive electrode. This film serves to suppress the side reaction between the electrolyte and the positive electrode active material, thereby providing good charge/discharge cycle characteristics even in a high-temperature environment.

In the formula (1), the element L is preferably at least one selected from the group consisting of Mg, Al, Ti, and Sr. It is considered that alkaline oxides produced from these elements, such as MgO and $Al_2O_3$, have the effect of enhancing the action of the metal oxide NiO as the polymerization initiator, thereby enabling formation of a good polymer-like protective film on the positive electrode.

The non-aqueous electrolyte preferably contains 0.5 to 10 parts by weight of vinyl ethylene carbonate per 100 parts by weight of the main solvent. It is preferred that the non-aqueous electrolyte further contain vinylene carbonate. Vinylene carbonate having a carbon-carbon unsaturated bond forms a thin polymer-like film on the surface of the positive electrode active material upon charge. On the other hand, 1,3-butadiene derived from vinyl ethylene carbonate forms a film by polymerization on the surface of the positive electrode active material containing the metal oxide NiO. These two films combine to form a hybrid film that is particularly highly resistant to heat, and this hybrid film is considered to be highly capable of suppressing the side reaction between the electrolyte and the positive electrode active material.

The present invention can suppress the side reaction between the non-aqueous electrolyte and the positive electrode active material, thereby providing a non-aqueous electrolyte secondary battery that has good charge/discharge cycle characteristics even in a high-temperature environment.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWING

FIG. 1 is a longitudinal sectional view of a cylindrical non-aqueous electrolyte secondary battery according to examples of the present invention.

DETAILED DESCRIPTION OF THE INVENTION

As described above, the present invention is based on the findings that the combination of a positive electrode containing a composite oxide represented by the formula (1): $LiNi_xM_{1-x-y}L_yO_2$ as a positive electrode active material and a non-aqueous electrolyte containing vinyl ethylene carbonate suppresses the side reaction between the non-aqueous electrolyte and the positive electrode active material, thereby providing good charge/discharge cycle characteristics even in a high-temperature environment.

In the formula (1), if x is less than 0.3, the capacity retention rate becomes insufficient when a charge/discharge cycle is repeated at high temperatures. This is probably because the small Ni content in the composite oxide results in production of a small amount of the metal oxide NiO, so that 1,3-butadiene derived from vinyl ethylene carbonate is unlikely to cause a polymerization reaction, and therefore, a sufficient protective film is not formed on the positive electrode.

On the other hand, if x exceeds 0.9, the cycle characteristics at high temperatures deteriorate. This is probably because the excessive Ni content in the composite oxide results in excessive production of the metal oxide NiO, so that the polymerization reaction of 1,3-butadiene derived from vinyl ethylene carbonate proceeds violently to form an excessive protective film on the positive electrode, thereby interfering with the charge/discharge reaction. When x is in the range of $0.3 \leq x \leq 0.9$, the high temperature cycle characteristics are favorable. The range of $0.5 \leq x \leq 0.9$ is more preferable, and the range of $0.7 \leq x \leq 0.9$ is particularly preferable.

The element M is at least one selected from the group consisting of Co and Mn, and the element L is at least one selected from the group consisting of Mg, Al, Ti, Sr, Zn, B, Ca, Cr, Si, Ga, Sn, P, V, Sb, Nb, Ta, Mo, W, Zr, Y and Fe.

The element L has the effect of reducing a change in the crystal structure of the positive electrode active material and improving the capacity and thermal stability. If the amount of the element L, i.e., y, exceeds 0.1, the capacity may decrease or the action of the metal oxide NiO as the polymerization initiator may become excessive. If the action as the polymerization initiator becomes excessive, the high temperature cycle characteristics degrade. Among the elements L, Mg, Al, Ti, and Sr are particularly preferred. Since they produce a large effect in activating the action of the metal oxide NiO as the polymerization initiator, the value of y can be lowered, so that a high capacity can be maintained effectively. In order to obtain the ideal effect of the element L, the range of $0.001 \leq y \leq 0.05$ is preferable, and the range of $0.005 \leq y \leq 0.05$ is more preferable.

Such positive electrode active materials may be used singly or in combination with two or more of them. It is also possible to use a combination of a composite oxide represented by the formula (1) and the other compounds (e.g., $LiCoO_2$, $LiNiO_2$, $LiMnO_2$, $LiMn_2O_4$, etc). However, in terms of sufficiently ensure the effects of the present invention, it is preferred that the other compounds than the composite compounds represented by the formula (1) be not more than 70% by weight of the whole positive electrode active material.

Among the composite oxides represented by the formula (1), composite oxides represented by the formulas such as $LiNi_xCo_{1-x}O_2$ ($0.3 \leq x \leq 0.9$), $LiNi_xMn_{1-x}O_2$ ($0.3 \leq x \leq 0.9$), $LiNi_x(Mn_{1-z}Co_z)_{1-x}O_2$ ($0.3 \leq x \leq 0.9$, $0.3 \leq z \leq 0.995$), $LiNi_xCo_{1-x-y}L_yO_2$ ($0.3 \leq x \leq 0.9$, $0.001 \leq y \leq 0.1$), $LiNi_xMn_{1-x-y}L_yO_2$ ($0.3 \leq x \leq 0.9$, $0.001 \leq y \leq 0.1$), $LiNi_x(Mn_{1-z}Co_z)_{1-x-y}L_yO_2$ ($0.3 \leq x \leq 0.9$, $0.001 \leq y \leq 0.1$, $0.3 \leq z \leq 0.995$) are particularly preferred, because they are highly likely to produce the effects of the present invention.

The positive electrode can include a conductive agent, a binder made of resin, etc., in addition to the positive electrode active material. For example, the positive electrode can be obtained by placing a positive electrode mixture containing a positive electrode active material, a binder and a conductive agent on a positive electrode current collector made of metal foil.

The negative electrode capable of absorbing and desorbing lithium preferably includes a carbon material as a negative electrode active material. As the carbon material, various artificial graphites, natural graphites, etc., are preferably used. Also, materials known as negative electrode active materials of non-aqueous electrolyte secondary batteries can be used without any particular limitation. For example, various composite oxides, metals that can be alloyed with lithium, alloys, and alkali metals, such as lithium and sodium, can also be used.

As the main solvent of the non-aqueous electrolyte according to the present invention, cyclic carbonic acid esters, chain carbonic acid esters, cyclic carboxylic acid esters, etc., are preferably used. It is preferred to use them in combination of two or more of them. However, if the main solvent contains a cyclic carboxylic acid ester, the cyclic carboxylic acid ester may form a film on the positive electrode by ring-opening polymerization, thereby impairing the polymerization reaction of 1,3-butadiene derived from vinyl ethylene carbonate. Hence, it is particularly preferred that the main solvent be a mixture of a cyclic carbonic acid ester and a chain carbonic acid ester.

Exemplary cyclic carbonic acid esters include propylene carbonate, ethylene carbonate, butylene carbonate, fluoroethylene carbonate, and trifluoropropylene carbonate. Exemplary chain carbonic acid esters include diethyl carbonate, ethyl methyl carbonate, dimethyl carbonate, ethyl-2,2,2-trifluoroethyl carbonate, and di-2,2,2-trifluoroethyl carbonate. Exemplary cyclic carboxylic acid esters include γ-butyrolactone, γ-valerolactone, α-methyl-γ-butyrolactone, and β-methyl-γ-butyrolactone. It should be noted that although vinyl ethylene carbonate and vinylene carbonate are classified into the category of cyclic carbonic acid esters, they are excluded from the main solvents of the present invention.

Exemplary solutes include lithium hexafluorophosphate (hereinafter referred to as $LiPF_6$), lithium tetrafluoroborate ($LiBF_4$), and lithium bistrifluoromethyl sulfonate imide ($LiN(CF_3SO_2)_2$). They may be used singly or in combination with two or more of them.

The amount of vinyl ethylene carbonate contained in the non-aqueous electrolyte is preferably 0.5 to 10 parts by weight, more preferably 1 to 5 parts by weight, per 100 parts by weight of the main solvent. Also, when the non-aqueous electrolyte further contains vinylene carbonate, the total amount of vinyl ethylene carbonate and vinylene carbonate is preferably 0.5 to 10 parts by weight, more preferably 2 to 5 parts by weight, per 100 parts by weight of the main solvent. The weight ratio between vinyl ethylene carbonate (VEC) and vinylene carbonate (VC) is preferably VEC:VC=1:9 to 10:0.

With respect to the shape, etc., of the battery according to the present invention, there is no particular limitation. The present invention is applicable to batteries of any shape, such as cylindrical or rectangular shapes. Also, the present invention is applicable to batteries having a layered electrode plate group that is obtained by layering a positive electrode and a negative electrode with a separator interposed therebetween, and a cylindrical electrode plate group that is obtained by winding a positive electrode and a negative electrode with a separator interposed therebetween.

The present invention is hereinafter described specifically by way of Examples. These Examples, however, are not to be construed as limiting in any way the present invention. Although a carbon material capable of absorbing and desorbing lithium was used in the negative electrodes of non-aqueous electrolyte secondary batteries of the Examples, the use of a simple metal that can be alloyed with lithium, an alloy or a composite oxide, or the use of an alkali metal such as lithium or sodium can also produce essentially the same effects.

Example 1

(i) Preparation of Non-Aqueous Electrolyte $LiPF_6$ was dissolved at a concentration of 1.0 mol/L in a solvent mixture of ethylene carbonate (hereinafter referred to as EC) and ethyl methyl carbonate (hereinafter referred to as EMC) (volume ratio 1:3). 2 parts by weight of vinyl ethylene carbonate (hereinafter referred to as VEC) per 100 parts by weight of the solvent mixture was added to the resultant solution, to prepare a non-aqueous electrolyte.

(ii) Preparation of Positive Electrode Plate 85 parts by weight of a positive electrode active material ($LiNi_{0.75}Co_{0.25}O_2$) powder, 10 parts by weight of acetylene black serving as a conductive agent, and 5 parts by weight of polyvinylidene fluoride resin serving as a binder were mixed together, and the mixture was dispersed in dehydrated N-methyl-2-pyrrolidone, to prepare a positive electrode mixture slurry. This positive electrode mixture was applied onto a positive electrode current collector made of aluminum foil, dried and rolled, to obtain a positive electrode plate.

(iii) Preparation of Negative Electrode Plate 75 parts by weight of an artificial graphite powder, 20 parts by weight of acetylene black serving as a conductive agent, and 5 parts by weight of polyvinylidene fluoride resin serving as a binder were mixed together, and the mixture was dispersed in dehydrated N-methyl-2-pyrrolidone, to prepare a negative electrode mixture slurry. This negative electrode mixture was applied onto a negative electrode current collector made of copper foil, dried and rolled, to obtain a negative electrode plate.

(iv) Production of Cylindrical Battery

A cylindrical battery was produced using the above-mentioned positive electrode plate and negative electrode plate. FIG. 1 shows a longitudinal sectional view thereof.

A positive electrode plate 11 and a negative electrode plate 12 were wound with a separator 13 interposed therebetween, to produce an electrode plate group. The electrode plate group was housed in an iron battery case 18 plated with nickel. An aluminum positive electrode lead 14 attached to the positive electrode plate 11 was connected to a positive electrode terminal 20. The positive electrode terminal 20 is joined to a conductive member fitted to the center of a resin sealing plate 19, and the positive electrode lead 14 is connected to the backside of the conductive member. Also, a nickel negative electrode lead 15 attached to the negative electrode plate 12 was connected to the bottom of the battery case 18. An insulator plate 16 and an insulator plate 17 were mounted on top of and under the electrode plate group, respectively. Then, a predetermined non-aqueous electrolyte was injected into the battery case 18, and the opening of the battery case 18 was sealed with the sealing plate 19.

(v) Evaluation of Battery

The battery produced as described above was subjected to repetitive charge/discharge cycling at 45° C. Assuming that the discharge capacity at the 3rd cycle was 100%, the capacity of the battery after 500 cycles was calculated as cycle retention rate. Table 1 shows the result.

In the charge/discharge cycles, a constant current-constant voltage charge was performed at a maximum current of 1050 mA and an upper limit voltage of 4.2 V for 2 hours and a half, and the non-operation time after the charge was 10 minutes. Also, a constant current discharge was performed at a discharge current of 1500 mA and an end-of-discharge voltage of 3.0 V, and the non-operation time after the discharge was 10 minutes.

TABLE 1

| | Positive electrode active material | VEC (part by weight) | Capacity retention rate after 500 cycles (%) |
|---|---|---|---|
| Example 1 | $LiNi_{0.75}Co_{0.25}O_2$ | 2 | 85.0 |
| Comparative example 1 | $LiNi_{0.75}Co_{0.25}O_2$ | None | 17.8 |
| Comparative example 2 | $LiCoO_2$ | 2 | 20.9 |
| Comparative example 3 | $LiCoO_2$ | None | 15.5 |

Comparative Example 1

A battery was produced in the same manner as in Example 1, except for the use of a solution that was prepared by dissolving $LiPF_6$ at a concentration of 1.0 mol/L in a solvent mixture of EC and EMC (volume ratio 1:3) as the non-aqueous electrolyte. This battery was subjected to charge/discharge cycling at 45° C.

Comparative Example 2

A battery was produced in the same manner as in Example 1, except for the use of lithium cobaltate ($LiCoO_2$) as the positive electrode active material. This battery was subjected to charge/discharge cycling at 45° C.

Comparative Example 3

A solution prepared by dissolving $LiPF_6$ at a concentration of 1.0 mol/L in a solvent mixture of EC and EMC (volume ratio 1:3) was used as the non-aqueous electrolyte, and lithium cobaltate ($LiCoO_2$) was used as the positive electrode active material. Except for these, a battery was produced in the same manner as in Example 1, and it was subjected to charge/discharge cycling at 45° C.

The cycle characteristics of batteries of Comparative Examples 1, 2 and 3 are also shown in Table 1. Table 1 indicates that the cycle characteristics are improved only when $LiNi_{0.75}Co_{0.25}O_2$ was used as the positive electrode active material and VEC was included in the non-aqueous electrolyte. This is probably because 1,3-butadiene derived from VEC caused a polymerization reaction on the surface of the positive electrode active material containing the metal oxide NiO in a sufficient amount, thereby forming a polymer-like protective film on the positive electrode.

Example 2

Various composite oxides as listed in Table 2 were used singly or in combination as the positive electrode active materials. In the case of using a mixture of a plurality of positive electrode active materials, the mixing ratios (% by weight) are shown in Table 2. Batteries were produced in the same manner as in Example 1 except for such variation in the positive electrode active material, and they were subjected to charge/discharge cycling at 45° C. Table 2 shows the results.

TABLE 2

| | Positive electrode active material | VEC (part by weight) | Capacity retention rate after 500 cycles (%) |
|---|---|---|---|
| Example 2 | $LiNi_{0.3}Co_{0.7}O_2$ | 2 | 80.2 |
| | $LiNi_{0.4}Co_{0.6}O_2$ | 2 | 80.5 |
| | $LiNi_{0.5}Co_{0.5}O_2$ | 2 | 80.8 |
| | $LiNi_{0.7}Co_{0.3}O_2$ | 2 | 85.1 |
| | $LiNi_{0.9}Co_{0.1}O_2$ | 2 | 84.4 |
| | $LiNi_{0.8}Co_{0.15}Mg_{0.05}O_2$ | 2 | 87.6 |
| | $LiNi_{0.8}Co_{0.15}Al_{0.05}O_2$ | 2 | 88.2 |
| | $LiNi_{0.82}Co_{0.15}Al_{0.03}O_2$ | 2 | 87.7 |
| | $LiNi_{0.84}Co_{0.15}Al_{0.01}O_2$ | 2 | 87.0 |
| | $LiNi_{0.845}Co_{0.15}Al_{0.005}O_2$ | 2 | 86.1 |
| | $LiNi_{0.8}Co_{0.15}Ti_{0.05}O_2$ | 2 | 87.8 |
| | $LiNi_{0.8}Co_{0.15}Sr_{0.05}O_2$ | 2 | 87.1 |
| | $LiNi_{0.8}Co_{0.15}Zn_{0.05}O_2$ | 2 | 84.2 |
| | $LiNi_{0.8}Co_{0.15}B_{0.05}O_2$ | 2 | 83.6 |
| | $LiNi_{0.8}Co_{0.15}Ca_{0.05}O_2$ | 2 | 85.4 |
| | $LiNi_{0.8}Co_{0.15}Cr_{0.05}O_2$ | 2 | 84.8 |
| | $LiNi_{0.8}Co_{0.15}Si_{0.05}O_2$ | 2 | 84.2 |
| | $LiNi_{0.8}Co_{0.15}Ga_{0.05}O_2$ | 2 | 85.3 |
| | $LiNi_{0.8}Co_{0.15}Sn_{0.05}O_2$ | 2 | 83.7 |
| | $LiNi_{0.8}Co_{0.15}P_{0.05}O_2$ | 2 | 84.1 |
| | $LiNi_{0.8}Co_{0.15}V_{0.05}O_2$ | 2 | 84.0 |
| | $LiNi_{0.8}Co_{0.15}Sb_{0.05}O_2$ | 2 | 83.9 |
| | $LiNi_{0.8}Co_{0.15}Nb_{0.05}O_2$ | 2 | 84.5 |
| | $LiNi_{0.8}Co_{0.15}Ta_{0.05}O_2$ | 2 | 84.1 |
| | $LiNi_{0.8}Co_{0.15}Mo_{0.05}O_2$ | 2 | 84.2 |
| | $LiNi_{0.8}Co_{0.15}W_{0.05}O_2$ | 2 | 83.7 |
| | $LiNi_{0.8}Co_{0.15}Zr_{0.05}O_2$ | 2 | 85.0 |
| | $LiNi_{0.8}Co_{0.15}Y_{0.05}O_2$ | 2 | 85.2 |
| | $LiNi_{0.8}Co_{0.15}Fe_{0.05}O_2$ | 2 | 83.6 |
| | $LiNi_{0.8}Co_{0.15}Al_{0.03}Zr_{0.02}O_2$ | 2 | 88.4 |
| | $LiNi_{0.8}Co_{0.15}Al_{0.03}Ta_{0.02}O_2$ | 2 | 88.0 |
| | $LiNi_{0.8}Co_{0.15}Al_{0.03}Nb_{0.02}O_2$ | 2 | 87.5 |
| | $LiNi_{0.8}Mn_{0.02}Co_{0.15}Al_{0.03}O_2$ | 2 | 87.6 |
| | $LiNi_{0.5}Mn_{0.5}O_2$ | 2 | 81.0 |
| | $LiNi_{0.3}Mn_{0.7}O_2$ | 2 | 80.2 |
| | $LiNi_{0.5}Mn_{0.4}Co_{0.1}O_2$ | 2 | 81.3 |
| | $LiNi_{1/3}Mn_{1/3}Co_{1/3}O_2$ | 2 | 80.4 |
| | $LiNi_{0.33}Mn_{0.33}Co_{0.29}Al_{0.05}O_2$ | 2 | 86.3 |
| | $LiNi_{0.33}Mn_{0.33}Co_{0.31}Al_{0.03}O_2$ | 2 | 86.0 |
| | $LiNi_{0.33}Mn_{0.33}Co_{0.33}Al_{0.01}O_2$ | 2 | 85.5 |
| | $LiNi_{0.33}Mn_{0.33}Co_{0.33}Mg_{0.05}O_2$ | 2 | 85.0 |
| | $LiNi_{0.8}Co_{0.15}Al_{0.05}O_2$ (80%) + $LiNi_{1/3}Mn_{1/3}Co_{1/3}O_2$ (20%) | 2 | 87.3 |
| | $LiNi_{0.8}Co_{0.15}Al_{0.05}O_2$ (80%) + $LiCoO_2$ (20%) | 2 | 87.0 |
| | $LiNi_{1/3}Mn_{1/3}Co_{1/3}O_2$ (30%) + $LiCoO_2$ (70%) | 2 | 80.1 |

Comparative Example 4

A battery was produced in the same manner as in Example 2 except for the use of $LiNi_{0.25}Co_{0.75}O_2$ as the positive electrode active material, and it was subjected to charge/discharge cycling at 45° C.

Comparative Example 5

A battery was produced in the same manner as in Example 2 except for the use of $LiNiO_2$ as the positive electrode active material, and it was subjected to charge/discharge cycling at 45° C.

The cycle characteristics of batteries of Comparative Examples 4 and 5 are shown in Table 3.

TABLE 3

| | Positive electrode active material | VEC (part by weight) | Capacity retention rate after 500 cycles (%) |
|---|---|---|---|
| Comparative example 4 | $LiNi_{0.25}Co_{0.75}O_2$ | 2 | 72.1 |
| Comparative example 5 | $LiNiO_2$ | 2 | 43.8 |

In Comparative Example 4, the cycle characteristics lowered. This is probably because the insufficient Ni content in the positive electrode active material resulted in production of a small amount of the metal oxide NiO, so that 1,3-butadiene derived from vinyl ethylene carbonate did not cause a sufficient polymerization reaction, and therefore, a sufficient protective film was not formed on the positive electrode.

In Comparative Example 5, the cycle characteristics also lowered. This is probably because the excessive Ni content in the positive electrode active material resulted in excessive production of the metal oxide NiO, so that the polymerization reaction of 1,3-butadiene derived from vinyl ethylene carbonate proceeded violently to form an excessive protective film on the positive electrode, thereby interfering with the charge/discharge reaction.

On the other hand, Table 2 indicates that the combination of a positive electrode active material represented by $LiNi_xM_{1-x-y}L_yO_2$ (M=Co, L=Mg, Al, Ti, Sr, Zn, B, Ca, Cr, Si, Ga, Sn, P, V, Sb, Nb, Ta, Mo, W, Zr, Y or Fe, $0.3 \leq x \leq 0.9$, $0 \leq y \leq 0.1$) and a non-aqueous electrolyte containing VEC can provide a battery with excellent high-temperature cycle characteristics. It also indicates that the use of a mixture of composite oxides represented by $LiNi_xM_{1-x-y}L_yO_2$, or the use of a mixture of a composite oxide represented by $LiNi_xM_{1-x-y}L_yO_2$ and another composite oxide (e.g., $LiCoO_2$) can also provide essentially the same good results. Further, when M=Mn, essentially the same result as that when M=Co was obtained. These results reveal that when the Ni content in the positive electrode active material is in the range of $0.3 \leq x \leq 0.9$, the high-temperature cycle characteristics are favorable, and that the range of $0.7 \leq x \leq 0.9$ is particularly preferable.

Also, Table 2 indicates that when the element L added to the positive electrode active material is at least one selected from the group consisting of Mg, Al, Ti, and Sr, a battery having particularly good high-temperature cycle characteristics can be obtained.

Example 3

$LiNi_{0.75}Co_{0.25}O_2$ was used as the positive electrode active material. Also, the non-aqueous electrolytes used were prepared by dissolving LiPF$_6$ at a concentration of 1.0 mol/L in a liquid mixture consisting of: 100 parts by weight of a solvent mixture of EC and EMC (volume ratio 1:3); and VEC in an amount as shown in Table 4. Batteries were fabricated in the same manner as in Example 1 except for the use of such non-aqueous electrolytes, and they were subjected to charge/discharge cycling at 45° C. Table 4 shows the results.

TABLE 4

| Positive electrode active material | VEC (part by weight) | Capacity retention rate after 500 cycles (%) |
|---|---|---|
| LiNi$_{0.75}$Co$_{0.25}$O$_2$ | 0.05 | 73.0 |
| | 0.1 | 75.7 |
| | 0.5 | 80.5 |
| | 1 | 83.2 |
| | 2 | 85.0 |
| | 3 | 85.5 |
| | 5 | 85.8 |
| | 10 | 86.1 |
| | 20 | 82.1 |

Table 4 indicates that the high-temperature cycle characteristics improve with an increase in the amount of VEC mixed therein. Also, the preferable mixing range of VEC is 0.5 to 10 parts by weight per 100 parts by weight of the solvent mixture.

Example 4

LiNi$_{0.75}$Co$_{0.25}$O$_2$ was used as the positive electrode active material. Also, the non-aqueous electrolytes used were prepared by dissolving LiPF$_6$ at a concentration of 1.0 mol/L in a liquid mixture consisting of: 100 parts by weight of a solvent mixture of EC, EMC and diethyl carbonate (DEC) (volume ratio 3:5:2); vinylene carbonate (hereinafter referred to as VC) (the mixed amounts are shown in Table 5); and 2 parts by weight of VEC. Batteries were fabricated in the same manner as in Example 1 except for the use of such non-aqueous electrolytes, and they were subjected to charge/discharge cycling at 45° C. Table 5 shows the results.

TABLE 5

| | VC (part by weight) | VEC (part by weight) | Capacity retention rate after 500 cycles (%) |
|---|---|---|---|
| Example 4 | 0 | 2 | 81.7 |
| | 1 | 2 | 84.5 |
| | 2 | 2 | 85.8 |
| Comparative example 6 | 1 | 0 | 17.7 |
| | 2 | 0 | 21.7 |

Comparative Example 6

Batteries were produced in the same manner as in Example 4 except that non-aqueous electrolytes were prepared by not adding VEC thereto and by mixing VC therein (the mixed amounts are shown in Table 5), and they were subjected to charge/discharge cycling at 45° C. Table 5 shows the results.

The cycle characteristics of batteries of Comparative Example 6 are also shown in Table 5. Table 5 indicates that the batteries of the present invention with the electrolyte containing VEC or with the electrolytes containing VEC and VC exhibit excellent high-temperature cycle characteristics. It also shows that the use of the combination of VEC and VC can provide particularly excellent high-temperature cycle characteristics.

The non-aqueous electrolyte battery according to the present invention exhibits excellent cycle characteristics even in a high-temperature environment. This non-aqueous electrolyte secondary battery is useful as the driving power source for various electronic devices including cellular phones.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising: a positive electrode capable of absorbing and desorbing lithium; a negative electrode capable of absorbing and desorbing lithium; a separator interposed between said positive electrode and said negative electrode; and a non-aqueous electrolyte,
wherein said positive electrode comprises a composite oxide represented by formula (1): LiNi$_x$M$_{1-x-y}$L$_y$O$_2$ as an active material, where said formula (1) satisfies $0.3 \leq x \leq 0.9$ and $0 < y < 0.1$, element M is at least one selected from the group consisting of Co and Mn, and element L comprises at least one of Mg, Al, Ti, and Sr, and
said non-aqueous electrolyte comprises a main solvent, a solute, and vinyl ethylene carbonate, and vinylene carbonate.

2. The non-aqueous electrolyte secondary battery in accordance with claim 1, wherein in said formula (1), said element L further comprises at least one of Zn, B, Ca, Cr, Si, Ga, Sn, P, V, Sb, Nb, Ta, Mo, W, Zr, Y and Fe.

3. The non-aqueous electrolyte secondary battery in accordance with claim 1, wherein said non-aqueous electrolyte contains 0.5 to 10 parts by weight of said vinyl ethylene carbonate per 100 parts by weight of said main solvent.

4. The non-aqueous electrolyte secondary battery in accordance with claim 1, wherein an amount of Ni is 30 mol % or more of a total amount of Ni, the element M and the element L.

5. The non-aqueous electrolyte secondary battery in accordance with claim 1, wherein an amount of vinylene carbonate is equal to or less than an amount of vinyl ethylene carbonate.

6. The non-aqueous electrolyte secondary battery in accordance with claim 1, wherein a weight ratio between vinyl ethylene carbonate and vinylene carbonate is 1:9 to 10:5.

7. The non-aqueous electrolyte secondary battery in accordance with claim 1, wherein $0.005 \leq y \leq 0.05$.

* * * * *